US010997059B2

(12) United States Patent
Yi

(10) Patent No.: US 10,997,059 B2
(45) Date of Patent: *May 4, 2021

(54) GENERATING TEST SCRIPTS FOR TESTING A NETWORK-BASED APPLICATION

(71) Applicant: International Business Machines Corporation, Armonk, NY (US)

(72) Inventor: Ang Yi, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/200,706

(22) Filed: Nov. 27, 2018

(65) Prior Publication Data

US 2019/0095319 A1 Mar. 28, 2019

Related U.S. Application Data

(63) Continuation of application No. 15/214,552, filed on Jul. 20, 2016, now Pat. No. 10,248,552.

(51) Int. Cl.
*G06F 11/00* (2006.01)
*G06F 11/36* (2006.01)

(52) U.S. Cl.
CPC ........ *G06F 11/3684* (2013.01); *G06F 11/368* (2013.01); *G06F 11/3664* (2013.01)

(58) Field of Classification Search
CPC .......................... G06F 11/368; G06F 11/3684
See application file for complete search history.

(56) References Cited

U.S. PATENT DOCUMENTS

| 5,754,755 | A | 5/1998 | Smith, Jr. |
| 6,772,083 | B2 * | 8/2004 | Muller ............... G06F 11/3664 702/123 |
| 7,680,668 | B2 | 3/2010 | Voruganti |
| 8,739,125 | B2 | 5/2014 | Petrovicky |
| 8,799,714 | B1 | 8/2014 | Guruswamy |
| 9,021,440 | B1 | 4/2015 | Chandrasekaran |
| 9,087,137 | B2 | 7/2015 | Amit |

(Continued)

FOREIGN PATENT DOCUMENTS

WO 2015112170 7/2015

OTHER PUBLICATIONS

"Parameterized Builds", Parameterized Builds—CircleCI, May 11, 2015, 6 pages, <https//circleci.com/docs/parameterized-builds>.

(Continued)

*Primary Examiner* — Michael Maskulinski
(74) *Attorney, Agent, or Firm* — William H. Hartwell; Aaron N. Pontikos

(57) ABSTRACT

There is provided a computer-implemented method of testing an application. The method, responsive to first mark data being included in second mark data, obtains second temporary test scripts for testing at least one test case of the second version of the application, wherein the second temporary test scripts being recorded with the second mark data. The method obtains a second correspondence between increased test data and increased data in the second mark data compared with the first mark data. The method substitutes the test data and the increased test data for the second mark data in the second temporary test scripts based on both the first and second correspondences to obtain second test scripts for testing the at least one test case of the second version of the application.

20 Claims, 5 Drawing Sheets

(56) References Cited

U.S. PATENT DOCUMENTS

| | | | |
|---|---|---|---|
| 9,317,406 | B2 | 4/2016 | Pilot |
| 9,753,842 | B2 * | 9/2017 | Raghavan ........... G06F 11/3684 |
| 9,910,941 | B2 | 3/2018 | Dusanapudi |
| 10,042,744 | B2 | 9/2018 | Herrin |
| 10,108,536 | B2 | 10/2018 | Li |
| 10,248,552 | B2 | 4/2019 | Yi |
| 10,324,831 | B1 | 6/2019 | Zhang |
| 2004/0044993 | A1 | 3/2004 | Müller |
| 2009/0204945 | A1 * | 8/2009 | Jain ....................... G06F 11/368 |
| | | | 717/124 |
| 2009/0217302 | A1 | 8/2009 | Grechanik |
| 2011/0314454 | A1 * | 12/2011 | Godefroid ........... G06F 11/3676 |
| | | | 717/131 |
| 2012/0023485 | A1 | 1/2012 | Dubey |
| 2013/0055028 | A1 | 2/2013 | Patil |
| 2013/0104105 | A1 | 4/2013 | Brown |
| 2013/0263089 | A1 | 10/2013 | Banerjee |
| 2014/0053021 | A1 | 2/2014 | Schwartz |
| 2015/0169432 | A1 | 6/2015 | Sinyagin |
| 2015/0227452 | A1 | 8/2015 | Raghavan |
| 2018/0024914 | A1 | 1/2018 | Yi |
| 2018/0096051 | A1 | 4/2018 | Barbas |
| 2019/0095319 | A1 | 3/2019 | Yi |

OTHER PUBLICATIONS

"Parameterizing a load or stress test", May 11, 2015, 4 pages, <http://www.appperfect.com/support/docs/load-test/loadtest/pararneters.html>.

IBM Appendix P, list of patents and patent applications treated as related, filed herewith, 2 pages.

* cited by examiner

GENERATING TEST SCRIPTS FOR TESTING A NETWORK-BASED APPLICATION

BACKGROUND OF THE INVENTION

The present disclosure relates to the technical field of software testing, and more particularly, to a method, a computer system, and a computer program product for testing a network-based application.

During development of a network-based application (hereinafter referred to as an application), programmers usually use specific test tools, browsers, and other tools to simulate actual scenarios, to test functionality of the application in a network device such as a server and/or a client linked to the server, so as to verify whether the intended functionality can be achieved.

SUMMARY

According to an embodiment of the present disclosure, there is provided a computer-implemented method for testing an application. The method, responsive to first mark data being included in second mark data, obtains second temporary test scripts for testing at least one test case of the second version of the application, wherein the second temporary test scripts being recorded with the second mark data; obtains a second correspondence between increased test data and increased data in the second mark data compared with the first mark data; and substitutes the test data and the increased test data for the second mark data in the second temporary test scripts based on both the first and second correspondences to obtain second test scripts for testing the at least one test case of the second version of the application.

According to another embodiment of the present disclosure, there is provided a computer system for testing an application, comprising: at least one processor, a memory coupled to the at least one processor, computer program instructions stored in the memory and executed by the at least one processor, to perform steps of: responsive to first mark data being included in second mark data, wherein the second mark data is used for testing a second version of the application, obtaining second temporary test scripts for testing at least one test case of the second version of the application, wherein the second temporary test scripts being recorded with the second mark data; obtaining a second correspondence between increased test data and increased data in the second mark data compared with the first mark data; and substituting the test data and the increased test data for the second mark data in the second temporary test scripts based on both the first and second correspondences to obtain second test scripts for testing the at least one test case of the second version of the application.

According to a further embodiment of the present disclosure, there is provided a computer program product for testing an application, comprising a computer readable storage medium, the computer readable storage medium storing program instructions thereon, the program instructions executed by at least one processor, causing the processor to: responsive to first mark data being included in second mark data, obtain second temporary test scripts for testing at least one test case of the second version of the application, wherein the second temporary test scripts being recorded with the second mark data; obtain a second correspondence between increased test data and increased data in the second mark data compared with the first mark data; and substitute the test data and the increased test data for the second mark data in the second temporary test scripts based on both the first and second correspondences to obtain second test scripts for testing the at least one test case of the second version of the application.

DETAILED DESCRIPTION

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
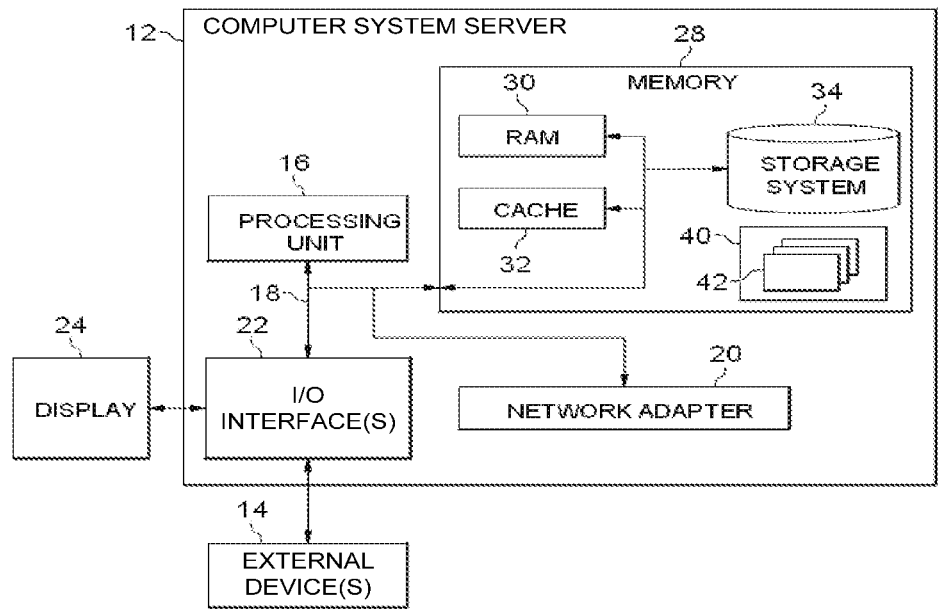
FIG. 1 shows an exemplary computer system which is applicable to implement at least some of the embodiments of the present disclosure.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
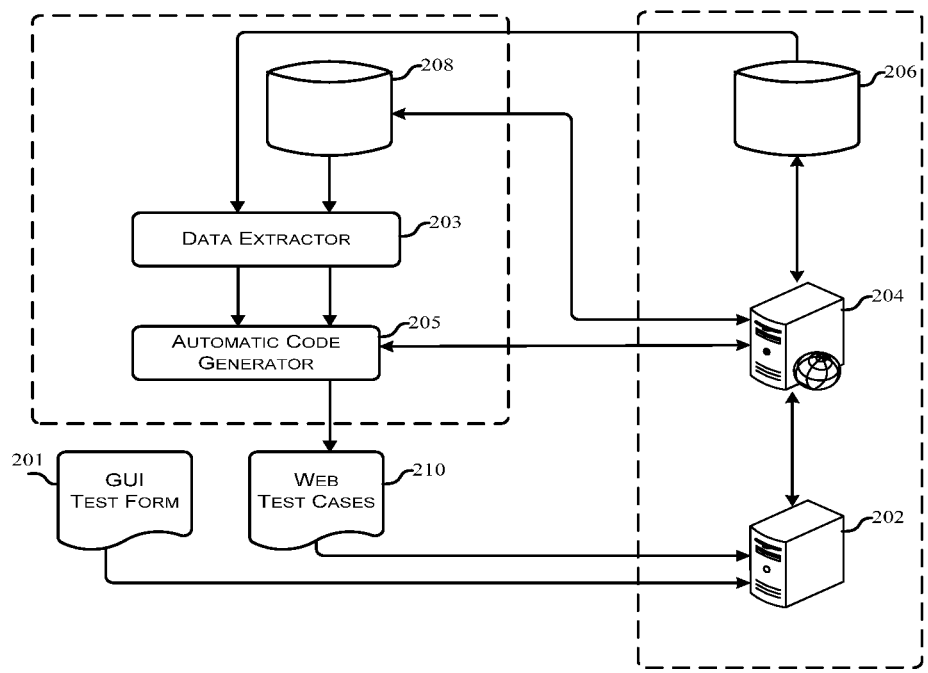
FIG. 2 is a block diagram depicting a computer system for testing an application according to an embodiment of the present disclosure.

FIG. 2 is a block diagram of a computer system for testing an application according to an embodiment of the present disclosure. The system as shown in the FIG. 2 includes a test device 202, a server device 204, a database 206, a mark database 208, a data extractor 203, and an automatic code generator 205. The test device 202 may be a personal computer (PC), a tablet computer, or any other computing device, which performs a test on a network-based application. The test may be, but not limited to, a HTTP test. A software program (also referred to as performance test tool software, or test tool, or tool software) is run on the test device 202. The software program is for example, but not limited to, the IBM Rational Performance Tester (RPT, a trademark of International Business Machine Corporation (IBM) located in the U.S.A.), Apache JMeter (a Java based test tool developed by Apache Organization), etc.

A network-based application to be tested is run on the server device 204. A development engineer can access the server device 204 through a browser executed on the test device 202, and perform a performance-or-stress-related test on the application through the performance test tool software.

The database 206 is used for storing various types of data used by the application to be tested. A tested application will use different data types, such as integer, floating point, character string, date, and so on. The database 206 is also used for storing test data. The test data is a simulation of real data that contains different data types, and of amount and distribution of client data.

The mark database 208 is used for storing mark data. The mark data is a set of data with data types, structure and unique values required by the application to be tested. The mark data have the same data type with that of the test data. The test data and the mark data are used by test cases pre-built by the development engineer for testing the application executed on the server device 204.

The data extractor 203 is used for extracting the data types and structures used for the tested application from data storage locations such as the database 206, and generating the test data and mark data based on the test scenario. For example, the data extractor 203 detects the data type of a character string with a length of 10 bits in the database 206, then it randomly generates a series of test data such as "STRING0001", "STRING0002", . . . , "STRING000N", etc. A special, unique value (the mark data) with the data type of the character string such as, but not limited to, "dirty_data_001" can also be randomly generated. However, the method of the data extractor 203 generating the test data and the mark data is not construed as a limitation on the scope of the disclosure.

The generated mark data can be stored in the mark database 208, and the generated test data can be stored in the database 206. According to one embodiment of the present disclosure, the database 206 and the mark database 208 may be combined into a single database. However, the storage location of the test data and the mark data does not limit the scope of the present disclosure. According to one embodiment of the present disclosure, they may be stored as data files in a memory of the test device 202 and/or server device 204, or they may be stored on other data processing devices communicatively connected to the test device 202 and/or the server device 204.

The automatic code generator 205 is used for reading temporary test scripts with the mark data, and scanning each part of the temporary test scripts, finding the mark data, and substituting the corresponding test data for the mark data based on the correspondence between the mark data and the test data.

The data extractor 203 and the automatic code generator 205 may be computer program modules which are stored in the memory 28 and executed in the processor unit 16 of computer system 12 as shown in FIG. 1, and also may be implemented by dedicated circuit hardware formed by curing a computer program in a general purpose hardware (e.g., processor), and its implementation is not construed as a limitation to the present disclosure.

According to one embodiment of the present disclosure, an application to be tested on the server device 204 includes a plurality of test cases 210. Each of the test cases is a test unit. For example, in a certain application, "Log-Query-Exit" is a test case. The test cases according to the embodiment of the present disclosure may comprise a plurality of test cases with logic relationships, and they are executed in order. For example, among three test cases including a first test case of "Log-Insert data-Exit", a second test case of "Log-Data Query-Exit" and a third test case of "Log-Delete data-Exit", the first test case is a basis, while the execution of the second and third test cases relies on the first test case.

In a procedure of testing the application, the development engineer needs to manually record temporary test scripts with sample data firstly, then to replace the sample data with the test data to obtain test scripts for testing the application. However, since the number of the test cases is huge, recording of the test scripts is of heavy workload.

Figure 3:
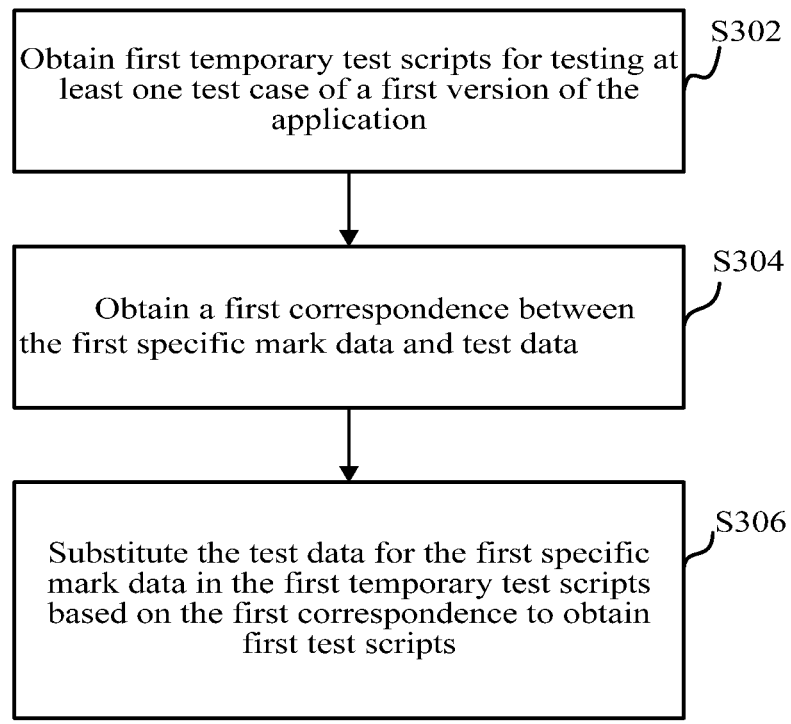
FIG. 3 is a flowchart illustrating a computer-implemented method of testing an application according to an embodiment of the present disclosure.

FIG. 3 is a flowchart illustrating a computer-implemented method of testing an application according to an embodiment of the present disclosure. As shown in the FIG. 3, the method of testing an application according to the embodiment of the present disclosure comprises the following steps. At step S302, first temporary test scripts for testing at least one test case of a first version of the application are obtained. The first temporary test scripts are recorded with the first mark data used for testing the first version of the application, when the at least one test case of the first version of the application is tested, so the first temporary test scripts comprise the first mark data. At step S304, a first correspondence between the first mark data used for testing the first version of the application and test data is obtained. At step S306, the test data is substituted for the first mark data in the first temporary test scripts based on the first correspondence to obtain first test scripts for testing the at least one test case of the first version of the application.

The method of testing the application according to the present disclosure further comprises: storing the first correspondence between the first mark data and the test data, for example, in the database such as database 206, which is stored in the storage or memory. The method of testing the application according to the present disclosure further comprises: testing the at least one test case of the first version of the application based on the first test scripts.

For sake of clarity, the embodiments of the present disclosure will be described by means of an example of a bank client information system. According to an embodiment of the present disclosure, the data should be prepared before testing the application. The data to be prepared includes the test data and the mark data. Since the test data and the mark data have exactly the same data types and structures, they are actually two sets of different product data. The mark data and the test data can be manually prepared by the development engineer, and they also can be automatically generated by the data extractor 203 extracting the data types and structures used by the tested application from the database such as databases 206 based on test scenarios.

According to the embodiment of the present disclosure, with respect to the application of the bank client information system, the mark data can be prepared as for example, but not limited to, "NON_EXIST_NAME", "1970-19-70", "NON_EXIST_DEGREE", and so on, as shown in Table 1 as below.

TABLE 1

| NON_EXIST_NAME | 1970-19-70 | NON_EXIST_DEGREE | ... |

The prepared mark data are used to label client information "client name", "date of birth", and "education background", respectively. These mark data has unique values and also has the corresponding data types and structure. To distinguish it from the mark data on the next stage, the mark data as prepared above are referred to as "the first mark data".

According to the embodiment of the present disclosure, the test data may be prepared as a plurality of data files, each file corresponding to one of the first mark data as prepared above. For example, the file of test data prepared for "client name" may be illustrated in Table 2 as below.

TABLE 2

| Tom Smith |
| Grace Lin |
| Jim Chou |
| Andy Zhu |
| Jerry John |
| Joshua Wesley |
| ... |

For example, the file of test data prepared for "date of birth" may be illustrated in Table 3 as below.

TABLE 3

| 1976 May 1 |
| 1978 Mar. 20 |
| 1980 Apr. 2 |
| 1985 Sep. 10 |
| 1999 Oct. 1 |
| ... |

For example, the file of test data prepared for "education background" may be illustrated in Table 4 as below.

TABLE 4

Ph. D
Master Degree
College
High school
Junior school
N/A
. . .

According to the embodiment of the present disclosure, the correspondence between the test data and the first mark data is established after completion of data preparation or at the same time when the data are prepared. The correspondence is illustrated in Table 5 as below.

TABLE 5

| NON_EXIST_NAME | 1970-19-70 | NON_EXIST_DEGREE | . . . |
|---|---|---|---|
| Table 2 | Table 3 | Table 4 | . . . |

According to the embodiment of the present disclosure, the above table which indicates the correspondence between the first mark data and the files of the test data is stored in for example the database 206. To distinguish it from the correspondence on the next stage, the correspondence as prepared above are referred to as "the first correspondence".

The operations of recording the test scripts according to the embodiment of the present disclosure will be described as follows. Specifically, an operation of obtaining first test scripts for testing at least one test case of the first version of the application will be described. The first temporary test scripts are recorded with the first mark data used for testing the at least one test case of the first version of the application when the at least one test case of the first version of the application is tested, and the first temporary test scripts comprise the first mark data used for testing the first version of the application.

Now it is assumed that the first version of the application of the bank client information system runs on the server device 204, and the test tool software for testing the first version of the application of the bank client information system runs on the test device 202. For sake of clarity of description, it is assumed that an operation of "Log-Update-Exit" is selected as the test case, and the mark data shown in the Table 1 are selected as the first mark data used for testing the first version of the application.

Figure 4:
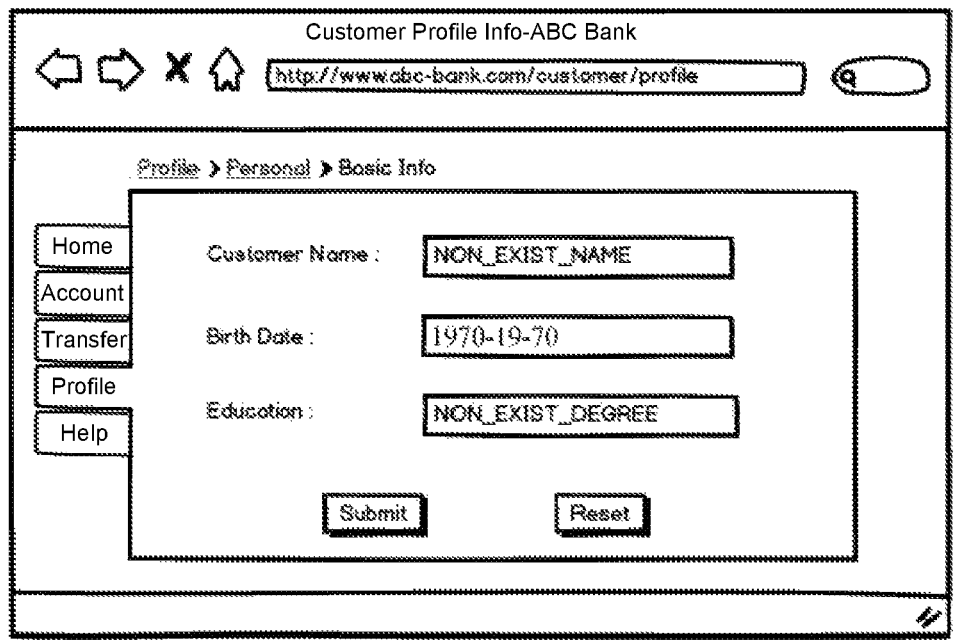
FIG. 4 shows a test form displayed on a test device for recording a test script according to an embodiment of the present disclosure.

FIG. 4 shows a test form displayed on the test device for recording test scripts according to the embodiment of the present disclosure. The development engineer accesses the application by inputting a network address such as the URL of the application of the bank client information system running on the server device 204, in an address bar of the browser running on the test device 202. A form 400 shown in FIG. 4 could be displayed on a screen of the test device 202 via the above accessing operation.

In the form 400 shown in FIG. 4, profile information of a client, such as "client name", "date of birth", and "education background" is illustrated. The development engineer clicks on a "reset" key to reset the value of each of the above field variables. After clicking on the "reset" key, the development engineer enters the first mark data "NON_EXIST_NAME", "1970-19-70" and "NON_EXIST_DEGREE" into input boxes corresponding to "client name", "date of birth", "education background" respectively, and then clicks on a "submit" button.

After clicking on the "submit" button, the browser on the test device 202 generates an HTTP request. The HTTP request is sent to the application of the bank client information system running on the server device 204 to request an operation of updating the client information.

The test tool software on the test device 202 intercepts and records the HTTP request, thereby forming a first temporary test script. According to the embodiment of the present disclosure, the HTTP request may be shown below. http://www.abcbank.com/client/profile?act=update&name=NON_EXIST_NAME&birth=1970-19-70&edu=NON_EXIST_DEGREE As can be seen, each of the field variables "client name", "date of birth", and "education background" is labeled with the first mark data "NON_EXIST_NAME", "1970-19-70", and "NON_EXIST_DEGREE", respectively.

The test tool software receives a first correspondence between the first mark data and the files of test data used for testing the first version of the application. Specifically, the automatic code generator 505 of the test tool software obtains the first correspondence between the first mark data used for testing the first version of the application of the bank client information system and the files of test data, as shown in Table 5, by accessing the database 206.

The test tool software substitutes the corresponding test data for the first mark data in the first temporary test script based on the obtained first correspondence to obtain s first test script for testing the test case of the first version of the application of the bank client information system. Specifically, the automatic code generator 205 of the test tool software substitutes the test data in the files shown in Table 2, Table 3, and Table 4 for each of the first mark data in the above HTTP request, and forms the first test script for testing the test case of the first version of the application.

The way of recording the first temporary test script is not construed as a limitation on the scope of the present disclosure. According to another embodiment of the present disclosure, an operation of recording the first temporary test script may also be automatically implemented on the test device 202 with the test tool software. All the current stress/performance test tools provide functionality of recording test scripts. During the recording, the test tools are able to record all HTTP Requests/Responses as the test scripts for playback in the test tools (test tools simulating thousands of users). Before the test, the first mark data in the first temporary test scripts need to be replaced with the prepared test data to simulate client scenarios.

In the method of testing the application according to the present disclosure, the test cases of the first version of application are tested by using the obtained first test scripts.

The above situation can also be illustrated by the following non-limiting example. For example, when the data are prepared, the first mark data "dirty_data_001" and the corresponding test data "test_data_001" are generated. In the temporary test script of the test case of the first version of the application, "var1=dirty_data_001" is recorded. Then, the first correspondence between the first mark data "dirty_data_001" and the corresponding test data "test_data_001" is referred to so that the test data "test_data_001" is substituted for the first mark data "dirty_data_001", and the test script "var1=test_data_001" is obtained.

In the procedure of testing the application, the development engineer may modify the program codes of the application based on the test results of the test cases of the first version of the application to eliminate errors in the application or improve the functionality of the application, thereby to form a second version of the application. Especially, in the DevOps (Development & Operations) and other agile developments, such modifications to the application bring many changes to parameters in the HTTP communications. For example, an existed parameter in a HTTP request may be renamed, deleted, or moved to other locations in a new HTTP communication, and a new parameter may also be introduced in the new HTTP communication.

Since the changes of the parameters in the HTTP requests/responses are unpredictable, after a change happens, the network performance test tools such as the RPT, and JMeter cannot automatically absorb the new changes of the HTTP parameters for a new software version. Accordingly, a lot of manual adjustments are needed so as to accommodate the changed HTTP parameters. With DevOps, Agile Development, and Continuous Integration widely used in the network developments, this situation occurs more frequently in the HTTP tests, greatly reducing efficiency of the test.

According to the other embodiment of the present disclosure, the operations of recording the test scripts under a condition that the positions and/or names of the field variables may change or the number of variables may decrease or increase will be described. Specifically, the operations of obtaining the second test scripts for testing the at least one test case of the second version of application will be described hereinafter.

In this case, there are two situations. The first situation is that the second mark data is included in a second mark data, e.g. the number of the second specific mark data used for testing the second version of the application decreases or does not change as compared to that of the first mark data used for testing the first version of the application. In this case, the second mark data are included in the first mark data. That means that, the data in the second mark data are less than or equal to that in the first mark data, or the second mark data are a subset of the first mark data.

The second situation is that the first mark data is included in the second mark data, e.g. the number of the second mark data used for testing the second version of the application increases as compared to that of the first mark data used for testing the first version of the application. In this case, the second mark data contain the first mark data. That means that, the data in the second mark data are more than that in the first mark data, or the second mark data contain new mark data that are not in the set of the first mark data.

Firstly, the first situation will be described. In this case, since the second mark data is included in the first mark data, e.g. the number of the second mark data used for testing the second version of the application decreases or does not change as compared to that of the first mark data used for testing the first version of the application, the second temporary test scripts are recorded with the second mark data when the at least one test case of the second version of the application is tested, in which the data in the second mark data are less than or equal to that in the first mark data.

Figure 5:
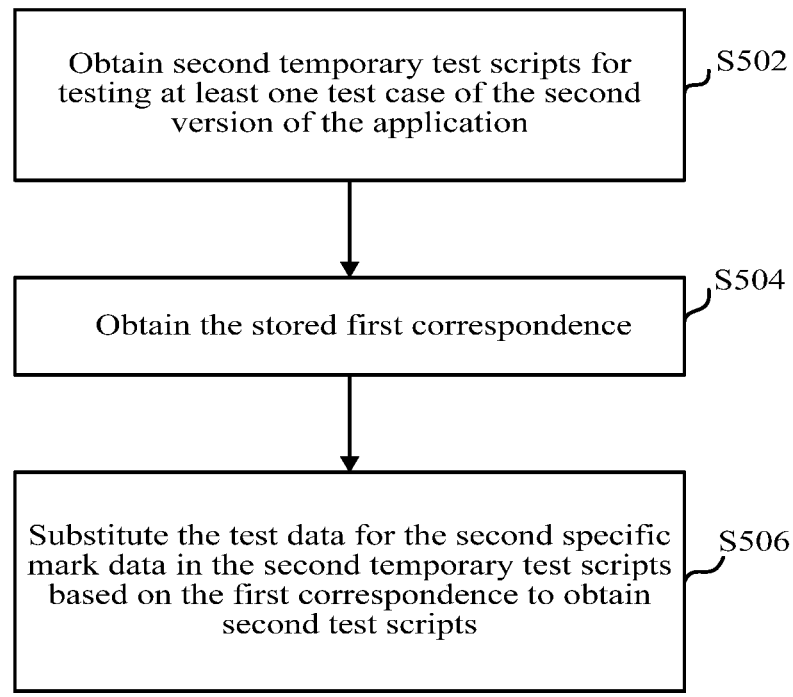
FIG. 5 is a flowchart illustrating a computer-implemented method of testing an application according to another embodiment of the present disclosure.

FIG. 5 is a flowchart illustrating a computer-implemented method of testing an application according to another embodiment of the present disclosure. As shown in the FIG. 5, the method of testing the application according to the other embodiment of the present disclosure comprises: in response to the second mark data being included in the first mark data, at step S502, second temporary test scripts for testing at least one test case of the second version of the application are obtained. The second temporary test scripts are recorded with the second mark data used for testing the at least one test case of the second version of the application when the at least one test case of the second version of the application is tested, so the second temporary test scripts include the second mark data used for testing the second version of the application. At step S504, the stored first correspondence between the first mark data and the test data is obtained. At step S506, the test data are substituted for the second mark data in the second temporary test scripts based on the first correspondence to obtain second test scripts for testing the at least one test case of the second version of the application.

Figure 6:
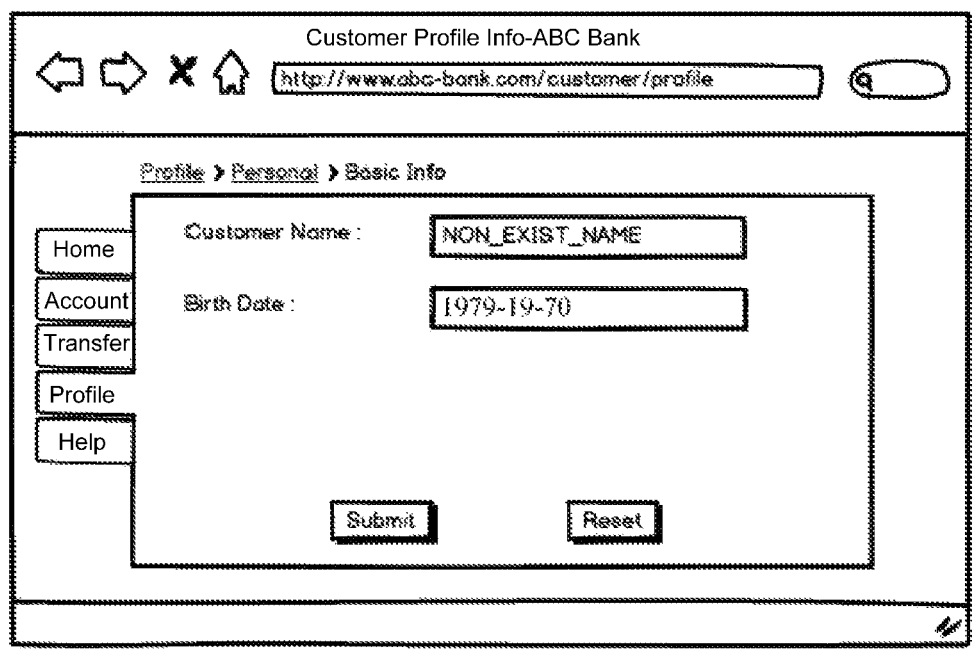
FIG. 6 shows a test form displayed on a test device for recording a test script according to another embodiment of the present disclosure.

FIG. 6 shows a test form displayed on the test device for recording test scripts according to the other embodiment of the present disclosure. The development engineer accesses the application by inputting the network address such as the URL of the application of the bank client information system running on the server device 204 in the address bar of the browser running on the test device 202. A form 600 shown in FIG. 6 is displayed on the screen of the test device 202 via the above accessing operation.

In the form 600 shown in FIG. 6, the profile information of a client such as "client name" and "date of birth" is illustrated. As compared to the form 400 shown in FIG. 4, the "education background" is canceled. In this embodiment, since the variable field "education background" is canceled, the second mark data "NON_EXIST_DEGREE" and its corresponding file of test data (Table 4) are not necessary. That is, the second mark data is included in the first mark data. In this case, the second mark data are a subset of the first mark data. Thus, the second temporary test scripts for testing the second version of the application are recorded by using part of the first mark data used for testing the first version of the application.

In this case, the recording process of the second temporary test scripts is the same as that of the first temporary test scripts. For sake of brevity, the detailed recording process is omitted.

The test tool software receives the first correspondence between the first mark data used for testing the first version of the application and the files of test data. Specifically, the automatic code generator 205 of the test tool software obtains the first correspondence between the first mark data used for testing the first version of the application of the bank client information system and the files of test data, as shown in Table 5, by accessing the database 206.

The test tool software substitutes the test data for the second mark data used for testing the second version of the application in the second temporary test scripts based on the obtained first correspondence to obtain second test scripts for testing the at least one test case of the second version of the application. Specifically, the automatic code generator 205 of the test tool software substitutes the test data in the files shown in Table 2 and Table 3 for each of the second mark data in the HTTP requests, and forms the second test scripts for testing the second version of the application.

In the method of testing the application according to the present disclosure, the test cases of the second version of application are tested by using the obtained second test scripts.

According to another embodiment of the present disclosure, the above situation can also be illustrated by the following non-limiting example. For example, when the data are prepared, the first mark data "dirty_data_001" and the corresponding test data "test_data_001" are generated. In the temporary test scripts of the test cases of the first version of the application, "var1=dirty_data_001" is recorded. It is assumed that in the test of the test cases of the second version of the application, the name of the field variable changes from "var1" to "var2", that is, the (manually or automatically) recorded test script is "var2=dirty_data_001". In this case, the first correspondence between the first mark data "dirty_data_001" and the corresponding test data "test_data_001" is referred to so that the test data "test_data_001" is substituted for the first mark data "dirty_data_001", and the test script "var2=test_data_001" is obtained. That is, even if a variation occurs to the name and location of the parameter variables, the identical mark data and the corresponding test data are used.

The second situation will be described hereinafter. In this case, since the first mark data is included in the second mark data, the second temporary test scripts cannot be recorded with only the first mark data when the at least one test case of the second version of the application is tested.

According to a further embodiment of the present disclosure, it is necessary to prepare more mark data than the first mark data to form the second mark data used for testing the second version of the application. In this case, the second temporary test scripts are recorded with the first mark data used for testing the first version of the application and the mark data increased as compared to the first mark data, when the test cases of the second version of the application are tested. Thereby, the second temporary test scripts include the first mark data and the mark data increased as compared to the first mark data.

Figure 7:
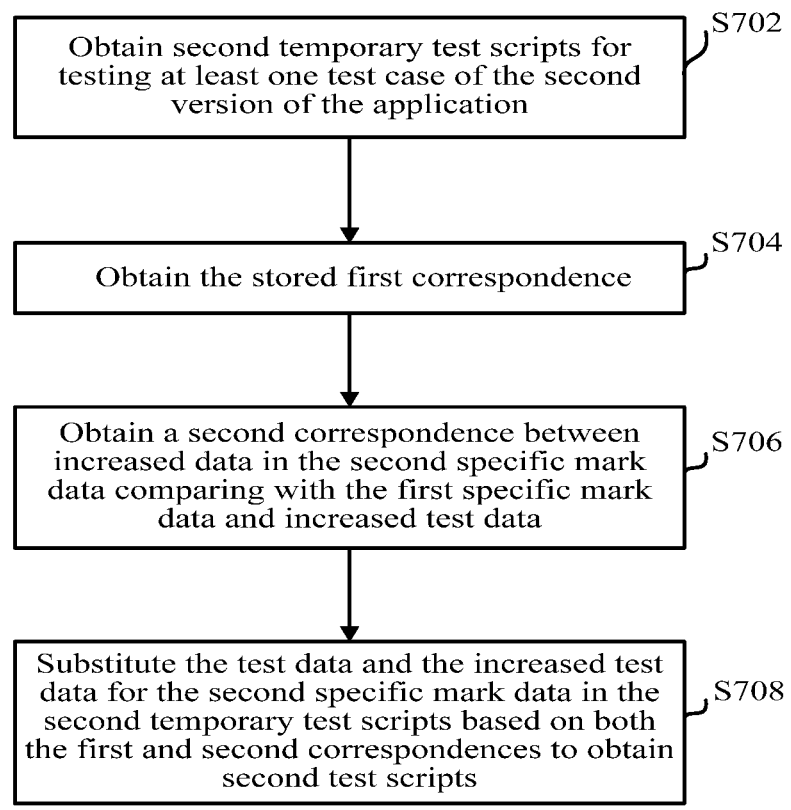
FIG. 7 is a flowchart illustrating a computer-implemented method of testing an application according to a further embodiment of the present disclosure.

FIG. 7 is a flowchart illustrating a computer-implemented method of testing the application according to the further embodiment of the present disclosure. As shown in the FIG. 7, the method of testing the application according to the further embodiment of the present disclosure comprises: in response to the first mark data being included in the second mark data: at step S702, second temporary test scripts for testing at least one test case of the second version of the application are obtained. The second temporary test scripts are recorded with the second mark data, when the at least one test case of the second version of the application is tested. The second temporary test scripts include the first mark data used for testing the first version of the application and mark data increased as compared to the first mark data. At step S704, the stored first correspondence between the first mark data and the test data is obtained. At step S706, a second correspondence between the mark data increased as compared to the first mark data and increased test data is obtained. At step S708, the test data and the increased test data are substituted for the second mark data in the second temporary test scripts based on the first and second correspondences to obtain second test scripts for testing the at least one test case of the second version of the application.

The method of testing the application according to the present disclosure further includes: testing the test cases of the second version of the application based on the obtained second test scripts.

Figure 8:
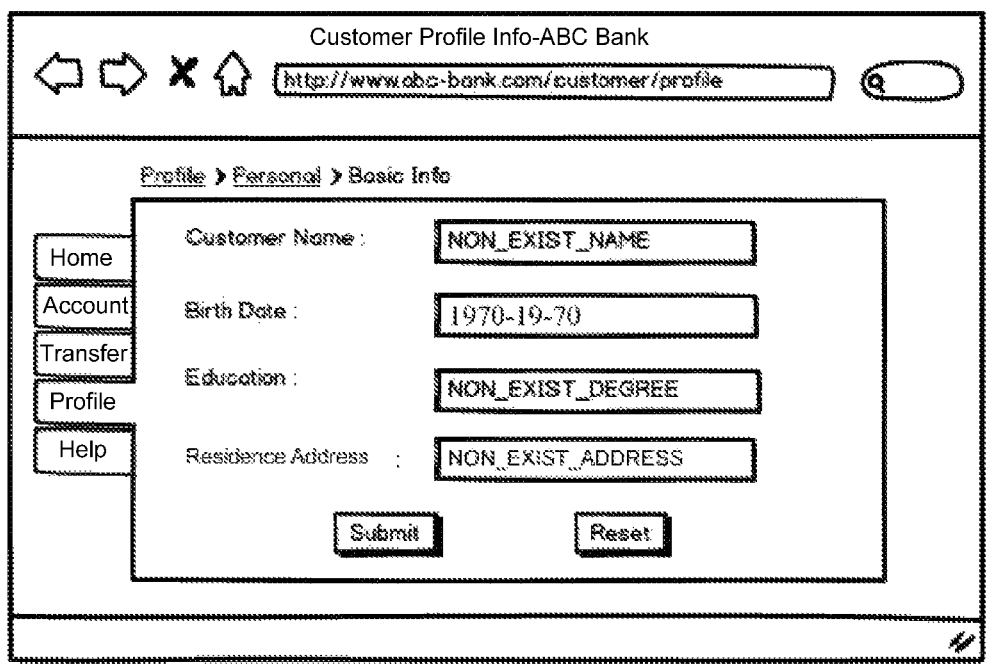
FIG. 8 shows a test form displayed on the test device for recording a test script according to a further embodiment of the present disclosure.

FIG. 8 shows a test form displayed on the test device for recording the test scripts according to the further embodiment of the present disclosure. For example, the development engineer accesses the application by inputting the network address such as the URL of the application of the bank client information system running on the server device 204 in the address bar of a browser running on the test device 202. A form 800 shown in FIG. 8 could be displayed on the screen of the test device 202 via the above accessing operation.

In the form 800 shown in FIG. 8, the profile information of a client, such as "client name", "date of birth", "education background", and "residence address" is illustrated. As compared to the form 400 shown in FIG. 4, "residence address" is added.

With respect to such a case, during the data preparation, increased mark data and increased test data file corresponding to the profile information of "residence address" of the client should be prepared, as shown in Tables 6 and 7.

TABLE 6

| NON_EXIST_ADDRESS |
| --- |

TABLE 7

| AAA |
| --- |
| BBB |
| CCC |
| DDD |
| EEE |
| FFF |
| GGG |
| ... |

A correspondence between the increased market data and the increased file of test data is established and stored, as shown in Table 8 below.

TABLE 8

| NON_EXIST_ADDRESS |
| --- |
| Table 7 |

According to the embodiment of the present disclosure, the above-added form representing the correspondence (hereinafter referred to as the second correspondence) between the increased file of test data and the increased market data is stored for example in the database 506.

The development engineer clicks on the "reset" key to reset the values of the client information. After clicking on the "reset" key, the development engineer enters the second mark data "NON_EXIST_NAME", "1970-19-70", "NON_EXIST_DEGREE", and "NON_EXIST_ADDRESS" into the input boxes corresponding to the field variables "client name", "date of birth", "education background", and "residence address" respectively, and clicks on the "submit" button.

After clicking on the "submit" button, the browser on the test device 202 generates an HTTP request. The HTTP request is sent to the application of the bank client information system running on the server device 204 to request an operation of updating the client information. The test tool software on the test device 202 intercepts and records the HTTP request, thereby forming the second temporary test script. According to the embodiment of the present disclosure, the HTTP request can be shown as: http://www.abcbank.com/client/profile?act=update&name=NON_EXIST_NAME&birth=1970-19-70&edu=NON_EXIST_DEGREE&addr=NON_EXIST_ADDRESS As can be seen from the above, each of the field variables "client name", "date of birth", "education background", and "residence address" of the client information is labeled with the second mark data "NON_EXIST_NAME", "1970-19-70", "NON_EXIST_DEGREE", and "NON_EXIST_ADDRESS" respectively.

The test tool software obtains the first correspondence between the first mark data used for testing the first version of the application and the files of test data, as shown in Table 5, and obtains the second correspondence between the mark data increased as compared to the first mark data and the increased file of test data, as shown in Table 8. Specifically, the automatic code generator 205 of the test tool software obtains the above first and second correspondences by accessing the database 206.

The test tool software substitutes the test data for the first mark data and the mark data increased as compared to the first mark data in the second temporary test scripts based on the obtained first and second correspondences (Table 5, Table 8) to obtain the second test scripts for testing the at least one test case of the second version of the application. Specifically, the automatic code generator 205 of the test tool software substitutes the test data in the files as shown in Table 2, Table 3, Table 4, and Table 7 for each of the mark data as shown in Table 1 and Table 6 in the above HTTP request, and forms the second test scripts for testing the test cases of the second version of the application.

The way of recording the second temporary test scripts is not construed as a limitation to the scope of the present disclosure. According to another embodiment of the present disclosure, the operation of recording the second temporary test scripts may also be automatically implemented by the test device 204 with the test tool software. All current stress/performance test tools provide functionality of recording test scripts. During the recording, the test tools will record all HTTP Requests/Responses as test scripts for playback in the test tools. Before the test, the mark data in the test scripts should be replaced with the prepared test data to simulate client scenarios.

In the method of testing the application according to the present disclosure, the test cases of the second version of application are tested by using the obtained second test scripts. Example of the above HTTP requests is not construed as a limitation to the scope of the present disclosure, which may be an HTTP response, or any other network communication. The above mark data, such as, "NON_EXIST_NAME", "1970-19-70", "NON_EXIST_DEGREE", "NON_EXIST_ADDRESS" are not construed as limitation to the scope of the present disclosure, and any other special unique value may be used.

In the method of testing the application according to the present disclosure, the test cases comprise a plurality of test cases with logical relations. In the method of testing the application according to the present disclosure, the first and second mark data are sets of data with the data types, data structures and unique values required by the application to be tested.

Each of the above steps can be implemented by executing computer program instructions stored in the memory 28 by the processor unit 16 of a computer system 12 as shown in FIG. 1.

Figure 9:
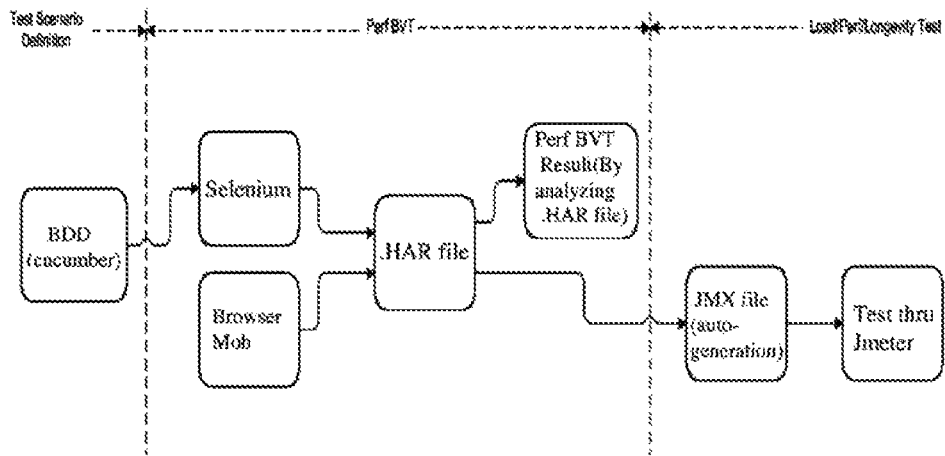
FIG. 9 is a flow chart depicting a live demonstration of the method and the system for testing the application according to the present disclosure.

FIG. 9 is a flow chart depicting a live demonstration of the method and the system for testing the application according to the present disclosure. In the FIG. 9, each node is an open source tool. As shown in the FIG. 9, there are three phases in the live demonstration, which are Test Scenario Definitions for defining the testing cases, Perf BVT (Build Verification Test) test for a single user, and Load/Perf/Longevity test for multiple users, respectively.

In the FIG. 9, BDD (Behavior Driven Development) is principally an idea about how the software development should be managed by both business interests and technical insight. Cucumber is a kind of open source software that implements the concept of the BDD. "Selenium" is an open source software testing framework for the web applications. Selenium provides a record/playback tool for authoring tests without learning a test scripting.

BrowserMob proxy is a free (Apache 2.0 license) utility that works well with the Selenium. It can capture performance data for web applications via a HAR format, as well as manipulate browser behavior and traffic, such as rewriting HTTP requests and responses. Here, ".HAR file" is a file format that indicates the HTTP Archive (HAR) format.

Apache JMeter is an Apache project that can be used as a load testing tool for analyzing and measuring the performance of a variety of services, with a focus on the web applications.

Figure 10:
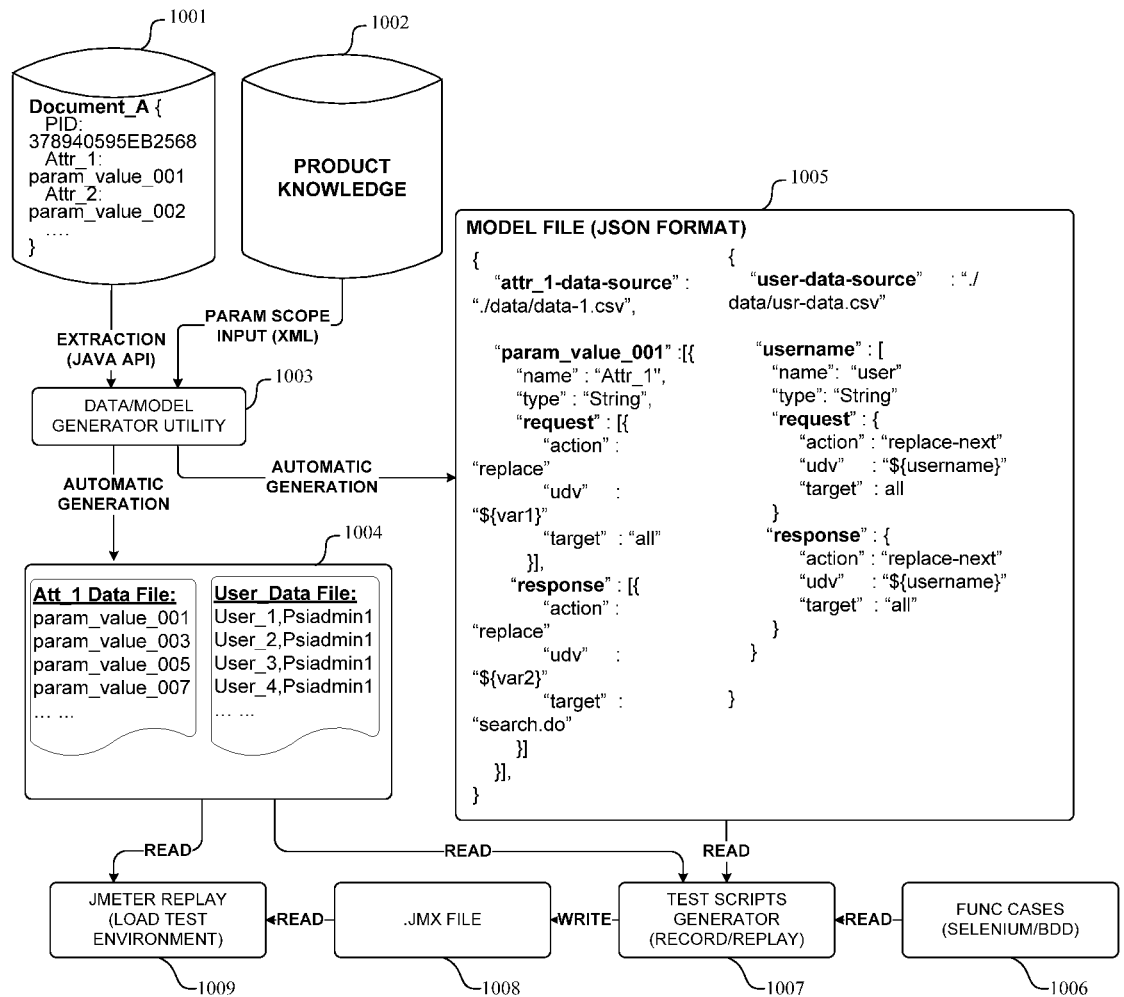
FIG. 10 is another flow chart depicting a live demonstration of the method and the system for testing the application according to the present disclosure.

FIG. 10 is another flow chart depicting a live demonstration of the method and the system for testing the application according to the present disclosure. In the FIG. 10, the reference numeral 1001 indicates a mark database for storing the mark data, the reference numeral 1002 indicates a knowledge base for the product (application) to be tested.

In the block 1003 corresponding to the data extractor 203 and the automatic code generator 205, two temporary files 1004 and 1005 may be generated based on the data from the mark database 1001 and the knowledge base 1002. The file 1004 is an attribute file for replaying test scripts. In the embodiments of the present disclosure, the test scripts are recorded with the mark data, and these mark data need to be replaced by general test data during the replaying of the test scripts. For example, as described above, the client name is recorded with the mark data "NON_EXIST_NAME", and during the replaying of the test scripts, the mark data "NON_EXIST_NAME" will be replaced by names of "Tom Smith", "Grace Lin", etc. All these general test data are stored in the attribute file 1004.

The file 1005 is a mark data description file, which indicates how to replace the mark data by the general test data. In the file 1005, "attr 1 data source" indicates the location information of the client name attribute file, "param_value_001" indicates a mark data which is the "NON_EXIST_NAME" in the above example, "name" indicates an attribute name, "type" indicates an attribute type, "Request" indicates what to do when the mark data appears in a HTTP request, "Response" indicates what to do when the mark data appears in a HTTP response, "action" indicates how to deal with the mark data, such as "replace", "replace next", . . . , "udv" indicates the name of variables for replacing, and "target" indicates a range for applying the action.

In the block 1006, the test cases are defined and recorded. In the block 1007, the test scripts are generated based on the files 1004, 1005, and the defined and recorded test cases. In the block 1008, the test scripts are written into an engineering file ".JMX" of the test tool JMETER. In the block 1009, the JMETER replays the test scripts based on the engineering file ".JMX" and the attribute file 1004.

According to the embodiments of the present disclosure, the test tools of the present disclosure may be, but not limited to, one of the RPT, and JMETER.

According to another embodiment of the present disclosure, the test tools of the present disclosure may also be any program codes made by those skilled in the art to achieve the same functions.

According to another embodiment of the present disclosure, there is also provided a computer system for testing an application. The computer system may be implemented by a computer system 12 as shown in FIG. 1, which includes for example a memory 28, at least one processor 16, and a display 24, and the like.

According to a further embodiment of the present disclosure, there is also provided a computer program product for testing an application. The computer program product includes a computer readable storage medium, the computer readable storage medium storing computer program instructions thereon, the computer program instructions are executed by at least one processor, such that the at least one processor could execute the method of testing the application according to the embodiments of the present disclosure.

According to the method, computer system and computer program product for testing the application, the network-based test scripts could automatically absorb the new changes frequently occurred in the new construction of the application.

The computer-implemented method, computer system and computer program product for testing the application according to the embodiments of the present disclosure have been described in details in combination with the drawings as above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer-implemented method of testing an application, the method comprising:
   responsive to first mark data being included in second mark data, wherein the first mark data is used for testing a first version of an application and the second mark data is used for testing a second version of the application, obtaining second temporary test scripts for testing at least one test case of the second version of the application, wherein the second temporary test scripts are recorded with the second mark data;
   obtaining a first correspondence between test data and data in the first mark data, and a second correspondence between increased test data and increased data in the second mark data compared with the first mark data; and
   substituting the test data and the increased test data for the second mark data in the second temporary test scripts based on both the first correspondence and the second correspondence to obtain second test scripts for testing the at least one test case of the second version of the application.

2. The method according to claim 1, further comprising:
   obtaining first temporary test scripts for testing at least one test case of the first version of the application, the first temporary test scripts being recorded with the first mark data used for testing the first version of the application.

3. The method of claim 2, further comprising:
   substituting the test data for the first mark data in the first temporary test scripts based on the first correspondence to obtain first test scripts for testing the at least one test case of the first version of the application; and
   testing the at least one test case of the first version of the application by using the first temporary test scripts.

4. The method according to claim 1, further comprising:
   storing the first correspondence.

5. The method according to claim 1, further comprising:
   responsive to the second mark data being included in the first mark data, wherein the second mark data is used for testing a second version of the application, obtaining the second temporary test scripts for testing the at least one test case of the second version of the application, wherein the second temporary test scripts are recorded with the second mark data; and
   substituting the test data for the second mark data in the second temporary test scripts based on the first correspondence to obtain the second test scripts for testing the at least one test case of the second version of the application.

6. The method according to claim 1, further comprising:
   testing the at least one test case of the second version of the application by using the second test scripts.

7. The method according to claim 1, wherein both the first mark data and the second mark data are sets of data with data type, structure and unique values required by the application.

8. A computer system for testing an application, comprising: at least one processor, a memory coupled to the at least one processor, computer program instructions stored in the memory and executed by the at least one processor, to perform steps of:
   responsive to first mark data being included in second mark data, wherein the first mark data is used for testing a first version of an application and the second mark data is used for testing a second version of the application, obtaining second temporary test scripts for testing at least one test case of the second version of the application, wherein the second temporary test scripts are recorded with the second mark data;
   obtaining a first correspondence between test data and data in the first mark data, and a second correspondence between increased test data and increased data in the second mark data compared with the first mark data; and
   substituting the test data and the increased test data for the second mark data in the second temporary test scripts based on both the first correspondence and the second correspondence to obtain second test scripts for testing the at least one test case of the second version of the application.

9. The computer system of claim 8, wherein the at least one processor executes the computer program instructions to perform steps of:
   obtaining first temporary test scripts for testing at least one test case of the first version of the application, the first temporary test scripts being recorded with the first mark data used for testing the first version of the application.

10. The computer system of claim 9, wherein the at least one processor executes the computer program instructions to perform steps of:
   substituting the test data for the first mark data in the first temporary test scripts based on the first correspondence to obtain first test scripts for testing the at least one test case of the first version of the application; and
   testing the at least one test case of the first version of the application by using the first temporary test scripts.

11. The computer system of claim 8, wherein the at least one processor executes the computer program instructions to perform steps of:
   storing the first correspondence.

12. The computer system of claim 8, wherein the at least one processor executes the computer program instructions to perform steps of:
   responsive to the second mark data being included in the first mark data, wherein the second mark data is used for testing a second version of the application, obtaining the second temporary test scripts for testing the at least one test case of the second version of the application, wherein the second temporary test scripts are recorded with the second mark data; and
   substituting the test data for the second mark data in the second temporary test scripts based on the first correspondence to obtain the second test scripts for testing the at least one test case of the second version of the application.

13. The computer system of claim 8, wherein the at least one processor executes the computer program instructions to perform steps of:
   testing the at least one test case of the second version of the application by using the second test scripts.

14. The computer system of claim 8, wherein both the first mark data and the second mark data are sets of data with data type, structure and unique values required by the application.

15. A computer program product for testing an application, comprising a computer readable storage medium, the computer readable storage medium storing program instructions thereon, the program instructions executed by at least one processor, causing the at least one processor to:
   responsive to first mark data being included in second mark data, wherein the first mark data is used for testing a first version of an application and the second mark data is used for testing a second version of the application, obtain second temporary test scripts for testing at least one test case of the second version of the application, wherein the second temporary test scripts are recorded with the second mark data;
   obtain a first correspondence between test data and data in the first mark data, and a second correspondence between increased test data and increased data in the second mark data compared with the first mark data; and
   substitute the test data and the increased test data for the second mark data in the second temporary test scripts based on both the first correspondence and the second correspondence to obtain second test scripts for testing the at least one test case of the second version of the application.

16. The computer program product of claim 15, wherein the program instructions, when executed on the processor, cause the processor to:
   obtain first temporary test scripts for testing at least one test case of the first version of the application, the first temporary test scripts being recorded with the first mark data used for testing the first version of the application.

17. The computer program product of claim 16, wherein the program instructions, when executed on the processor, cause the processor to:
   substitute the test data for the first mark data in the first temporary test scripts based on the first correspondence to obtain first test scripts for testing the at least one test case of the first version of the application; and
   test the at least one test case of the first version of the application by using the first temporary test scripts.

18. The computer program product of claim 15, wherein the program instructions, when executed on the processor, cause the processor to:
   store the first correspondence.

19. The computer program product of claim 15, wherein the program instructions, when executed on the processor, cause the processor to:
   responsive to the second mark data being included in the first mark data, wherein the second mark data is used for testing a second version of the application, obtain the second temporary test scripts for testing the at least one test case of the second version of the application, wherein the second temporary test scripts are recorded with the second mark data; and
   substitute the test data for the second mark data in the second temporary test scripts based on the first correspondence to obtain the second test scripts for testing the at least one test case of the second version of the application.

20. The computer program product of claim 15, wherein the program instructions, when executed on the processor, cause the processor to:
   test the at least one test case of the second version of the application by using the second test scripts.

* * * * *